US008787829B2

(12) United States Patent
Bang et al.

(10) Patent No.: US 8,787,829 B2
(45) Date of Patent: Jul. 22, 2014

(54) METHOD AND DEVICE FOR ESTABLISHING COMMUNICATION LINK BY SELECTING OBJECT FROM SCREEN

(75) Inventors: Seung Chan Bang, Daejeon (KR); Young Hoon Kim, Daejeon (KR); Don Sung Oh, Daejeon (KR); Il Gyu Kim, Okcheon (KR)

(73) Assignee: Electronics and Telecommunications Research Instittue, Daejeon (KR)

( * ) Notice: Subject to any disclaimer, the term of this patent is extended or adjusted under 35 U.S.C. 154(b) by 317 days.

(21) Appl. No.: 12/951,422

(22) Filed: Nov. 22, 2010

(65) Prior Publication Data

US 2011/0124287 A1    May 26, 2011

(30) Foreign Application Priority Data

Nov. 25, 2009  (KR) .................. 10-2009-0114747
Jul. 22, 2010  (KR) .................. 10-2010-0070966

(51) Int. Cl.
 *H04B 7/24*       (2006.01)
(52) U.S. Cl.
 USPC ........... 455/39; 455/41.1; 455/41.2; 340/988; 340/990
(58) Field of Classification Search
 USPC ........... 455/39, 41.1, 41.2, 456.1, 456.2, 457; 340/988, 990, 991, 992, 993
 See application file for complete search history.

(56) References Cited

U.S. PATENT DOCUMENTS

| 5,926,116 | A | 7/1999 | Kitano et al. |
| 7,624,028 | B1 * | 11/2009 | Brown ........................... 705/3 |
| 8,078,110 | B2 * | 12/2011 | Li et al. ....................... 455/63.1 |
| 2005/0266798 | A1 * | 12/2005 | Moloney et al. ............. 455/41.2 |
| 2008/0057942 | A1 * | 3/2008 | Woods et al. ................ 455/425 |
| 2011/0060837 | A1 | 3/2011 | Zhai et al. |

FOREIGN PATENT DOCUMENTS

CN          101499939         8/2009

OTHER PUBLICATIONS

Jun Rekimnoto, Yuji Ayatsuka, Michimune Kohno, Hauro Oba. "Proximal Interactions: A Direct Manipulation Technique for Wireless Networking", Interaction Laboratory, Sony Computer Science Laboratories, Inc. INTERACT2003, p. 1-8, 2003.
David Merrill and Pattie Maes, "Augmenting Looking, Pointing and Reaching Gestures to Enhance the Searching and Browsing of Physical Objects", 5th International Conference on Pervasive Computing, (Pervasive'07), pp. 1-18, May 2007, Toronto, Canada.

* cited by examiner

*Primary Examiner* — Tuan H Nguyen
(74) *Attorney, Agent, or Firm* — Kile Park Reed & Houtteman PLLC (57) ABSTRACT

A method for establishing a communication link of a first communication device includes: selecting a second communication device for establishing a communication link on a screen of the first communication device; transmitting a request for a communication link to the selected second communication device; receiving a communication link response from the second communication device; and establishing a communication link between the first communication device and the second communication device.

18 Claims, 3 Drawing Sheets

METHOD AND DEVICE FOR ESTABLISHING COMMUNICATION LINK BY SELECTING OBJECT FROM SCREEN

CROSS-REFERENCE TO RELATED APPLICATIONS

This application claims the priority of Korean Patent Application No. 10-2009-0114747 filed on Nov. 25, 2009 and No. 10-2010-0070966 filed on Jul. 22, 2010, in the Korean Intellectual Property Office, the disclosure of which is incorporated herein by reference.

BACKGROUND OF THE INVENTION

1. Field of the Invention

The present invention relates to a method and device for establishing a communication link by selecting an object from a screen and, more particularly, to a method and apparatus for establishing a communication link by selecting an object from a screen without using an existing identifier such as a phone number, a barcode, a name, an address, or the like.

2. Description of the Related Art

Numbers are one of the most typical means for selecting a target to perform communication in a wireless communication system. For example, a user communicates with a counterpart by using a mobile phone with the counterpart's phone number. This may be greatly convenient for the user over the remote counterpart, but not in a situation in which the user knows the counterpart but is unaware of his or her phone number so that the user is obliged to obtain the counterpart's phone number.

Meanwhile, Bluetooth™ enables a user to communicate with a counterpart within a short range without having the knowledge of his or her phone number; however, objects available for Bluetooth™ must be checked, instead of numbers, and one of them must be chosen, causing user inconvenience. Also, all objects having Bluetooth™ must be checked, wasting time, compared with a communication scheme allowing for direct communication with a counterpart. Thus, increasing of the range (or distance) for communication is burdensome.

The recently introduced Wi-Fi Direct covers a wider range, complementing the short-range drawbacks of Bluetooth™ but a counterpart is chosen by using numbers or a peripheral inspection, which, thus, is not convenient for a user with the intention of communication without prior information.

Attaching a barcode tag or an equivalent display means to each object and performing communication on the basis of the barcode tag or the equivalent display means require a database that matches the respective objects and the display means, so it would be difficult to apply this concept to various objects (e.g., an electronic device, a building, a person, and so on). Also, such a display means may be merely passively applied to obtain information from an object.

Meanwhile, RFID may include a means for obtaining information from an object and a means for communicating with the object; however, RFID also requires a database that matches the RFID to an object in a one-to-one manner like the barcode display means, causing an inconvenience.

When a ubiquitous service is to be provided, numerous ubiquitous devices must dynamically form a network. Thus, in this case, in establishing a communication link between devices, a method for selecting a device desired for communication with the address or name of the device is not intuitional and complicated, and the address or the names thereof must be known individually.

In order to solve this problem, an additional communication channel is created by using RFID, IrDA, or the like. The user may directly select a device he or she wants to communicate with by using RFID or an IrDA beam, exchange a specific ID of the device through the additional communication channel, and establish a direct communication link between the devices. When the communication link is normally established, a method of performing direct data communication through the existing wireless communication such as WLAN, Bluetooth™, or the like, may be used.

However, although a communication coverage of the WLAN or the like may reach tens of meters, the method of using RFID or IrDA limits a target device recognition distance by a maximum of a few meters, and in addition, a database for using RFID must be formed.

SUMMARY OF THE INVENTION

An aspect of the present invention provides a method for establishing a communication link by selecting an object from a screen without using an existing identifier such as a phone number, a barcode, a name, an address, and the like.

Another aspect of the present invention provides a device for establishing a communication link by selecting an object from a screen without using an existing identifier such as a phone number, a barcode, a name, an address, and the like.

According to an aspect of the present invention, there is provided a method for establishing a communication link of a first communication device, including: selecting a second communication device for establishing a communication link on a screen of the first communication device; transmitting a request for a communication link including information regarding the establishment of a link on the basis of the first communication device required for establishing a communication link to the selected second communication device; receiving a communication link response including information regarding the establishment of a communication link on the basis of the second communication device required for establishing a communication link from the second communication device; and establishing a communication link between the first communication device and the second communication device by using the information regarding the establishment of a link on the basis of the first communication device and the information regarding the establishment of a link on the basis of the second communication device.

The information regarding the establishment of a link may include at least one of the absolute space coordinates of a reference device and relative space coordinates between the reference device and a communication link establishment target device.

The link establishment information may include at least one of an image of the reference device, an image of the communication link establishment target device, and an image of the communication link establishment target device extracted from the screen.

The information regarding the establishment of a link may include a specific identifier which is at least one of a number, a barcode, a name, and an address that may uniquely express the identity of the reference device.

In the transmitting of the request for a communication link, the request for a communication link may be transmitted by forming a beam in the direction of the second communication device.

In the receiving of the communication link response, at least one communication link response may be received, and the communication link response from the second communication device may be extracted from the at least one communication link response.

In the extracting of the communication link response from the second communication device from the at least one communication link response, at least one of the information regarding the establishment of a link on the basis of the first communication device and the information regarding the establishment of a link on the basis of the second communication device included in the communication link response may be used.

In the receiving of the communication link response, a reception direction of the communication link response from the second communication device to the first communication device may be recognized.

According to another aspect of the present invention, there is provided a method for establishing a communication link of a second communication device, including: receiving information regarding the establishment of a link on the basis of a first communication device required for establishing a communication link from the first communication device; transmitting a communication link response including the information regarding the establishment of a link on the basis of the second communication device required for establishing a communication link to the first communication device; and establishing a communication link between the second communication device and the first communication device by using the information regarding the establishment of a link on the basis of the second communication device and the information regarding the establishment of a link on the basis of the first communication device.

The information regarding the establishment of a link may include at least one of the absolute space coordinates of a reference device and relative space coordinates between the reference device and a communication link establishment target device.

The link establishment information may include at least one of an image of the reference device, an image of the communication link establishment target device, and an image of the communication link establishment target device extracted from the screen.

The information regarding the establishment of a link may include a specific identifier which is at least one of a number, a barcode, a name, and an address that may uniquely express the identity of the reference device.

In the receiving of the request for a communication link, the direction in which the request for a communication link is received from the first communication device by the second communication device may be recognized.

In the transmitting of the communication link response, a beam may be formed in the direction of the first communication device and the communication link response may be transmitted.

According to another aspect of the present invention, there is provided a first communication device including: a camera unit collecting an image of a second communication device; a display unit displaying the collected image of the second communication device on a screen; a transmission unit transmitting a request for a communication link including information regarding the establishment of a link on the basis of the first communication device required for establishing a communication link to the second communication device; a reception unit receiving a communication link response including information regarding the establishment of a link on the basis of the second communication device required for establishing a communication link from the second communication device; and a controller selecting the second communication device displayed on the screen of the display unit, generating the request for a communication link, analyzing the communication link response, and establishing a communication link between the first communication device and the second communication device by using the information regarding the establishment of a link on the basis of the first communication device and the information regarding the establishment of a link on the basis of the second communication device.

The information regarding the establishment of a link may include at least one of the absolute space coordinates of a reference device and relative space coordinates between the reference device and a communication link establishment target device.

The link establishment information may include at least one of an image of the reference device, an image of the communication link establishment target device, and an image of the communication link establishment target device extracted from the screen.

According to another aspect of the present invention, there is provided a second communication device including: a reception unit receiving a request for a communication link including information regarding the establishment of a link on the basis of a first communication device required for establishing a communication link from the first communication device; a transmission unit transmitting a communication link response including information regarding the establishment of a link on the basis of the second communication device required for establishing a communication link to the first communication device; and a controller analyzing the received request for a communication link, generating the communication link response, and establishing a communication link between the second communication device and the first communication device by using the information regarding the establishment of a link on the basis of the second communication device and the information regarding the establishment of a link on the basis of the first communication device.

The information regarding the establishment of a link may include at least one of the absolute space coordinates of a reference device and relative space coordinates between the reference device and a communication link establishment target device.

The link establishment information may include at least one of an image of the reference device, an image of the communication link establishment target device, and an image of the communication link establishment target device extracted from the screen.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

Figure 1:
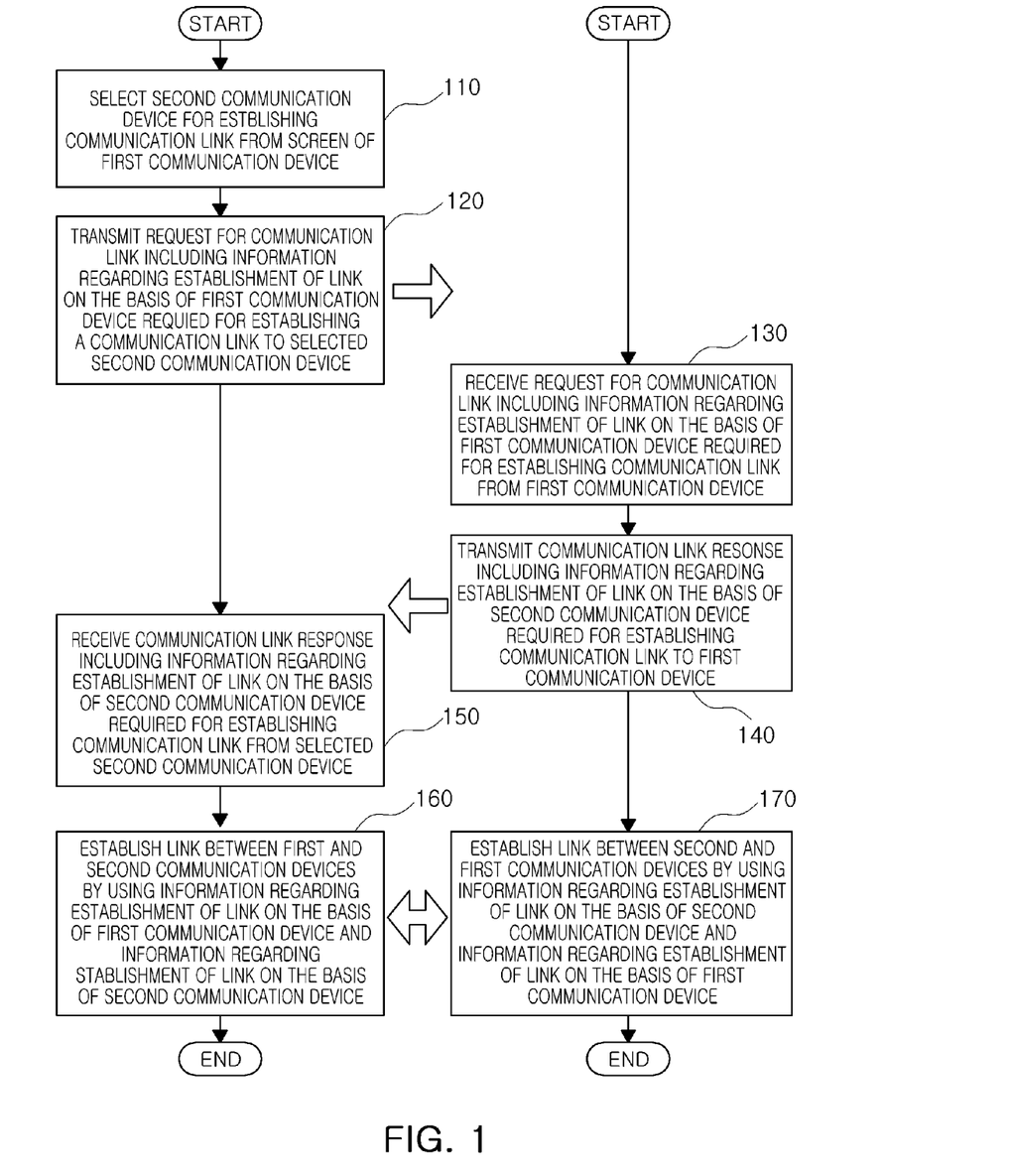
FIG. 1 is a flow chart illustrating the process of a method for selecting a target from a screen and establishing a communication link according to an exemplary embodiment of the present invention.
Figure 2:
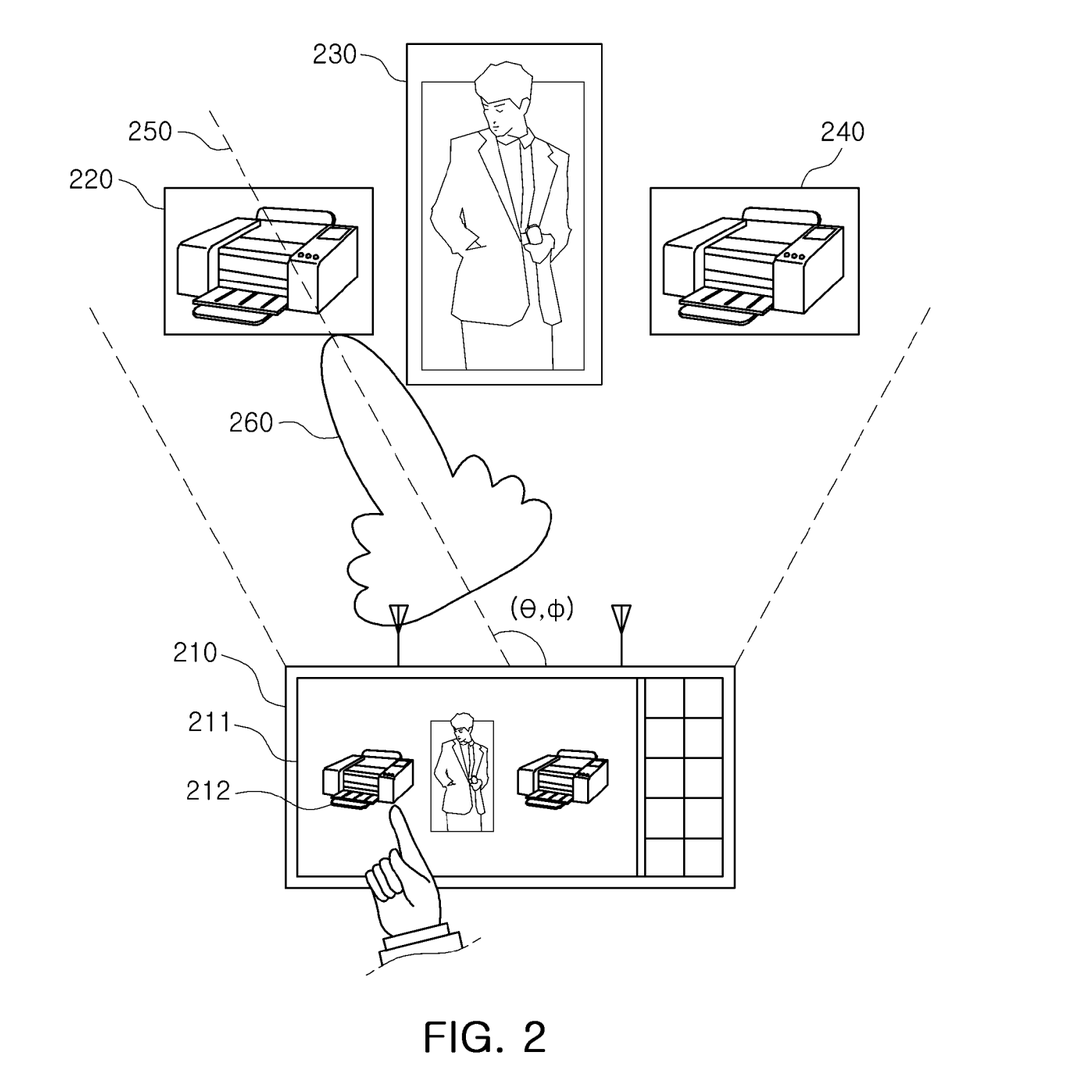
FIG. 2 is a view for explaining a method and device for selecting a target from a screen and establishing a communication link according to an exemplary embodiment of the present invention.

FIG. 1 is a flow chart illustrating the process of a method for selecting a target from a screen and establishing a communication link according to an exemplary embodiment of the present invention. FIG. 2 is a view for explaining a method and device for selecting a target from a screen and establishing a communication link according to an exemplary embodiment of the present invention.

With reference to FIGS. 1 and 2, a method for establishing a communication link of a first communication device by selecting a target from a screen according to an exemplary embodiment of the present invention may include: selecting a second communication device for establishing a communication link from a screen of the first communication device (step 110); transmitting a request for a communication link including information regarding the establishment of a link on the basis of the first communication device required for establishing a communication link to the selected second communication device (step 120); receiving a communication link response including information regarding the establishment of a communication link on the basis of the second communication device required for establishing a communication link from the second communication device (step 150); and establishing a communication link between the first communication device and the second communication device by using the information regarding the establishment of a link on the basis of the first communication device and the information regarding the establishment of a link on the basis of the second communication device (step 160).

In particular, the method for establishing a communication link of the first communication device is explained according to a left flow chart in FIG. 1.

In addition, a method for establishing a communication link of a second communication device by selecting a target from a screen according to an exemplary embodiment of the present invention may include: receiving information regarding the establishment of a link on the basis of a first communication device required for establishing a communication link from the first communication device (step 130); transmitting a communication link response including the information regarding the establishment of a link on the basis of the second communication device required for establishing a communication link to the first communication device (step 140); and establishing a communication link between the second communication device and the first communication device by using the information regarding the establishment of a link on the basis of the second communication device and the information regarding the establishment of a link on the basis of the first communication device (step 170).

In particular, the method for establishing a communication link of the second communication device is explained according to a right flow chart in FIG. 1.

First, In the step 110 of selecting the second communication device for establishing a communication link from the screen of the first communication device, a communication device to which a communication link is to be established may be selected from among one or more communication devices displayed on a display unit, or the like, of the first communication device and allocated as the second communication device.

Here, a communication device displayed at the center of the display unit may be automatically selected as the second communication device from among the one or more communication devices displayed on the display unit or the like of the first communication device, and a different particular position of the display unit may be designated and a communication device displayed (or present or expressed) at the designated position may be selected as the second communication device.

In addition, the second communication device may be selected through a touch input or an input, or the like, using a keypad from among the one or more communication devices displayed on the display unit of the first communication device.

For example, in FIG. 2, the first communication device 210 may receive an image regarding a communication device such as the second communication device by using a camera, or the like, process the received image such that the received image is magnified or reduced, and display the same on a display unit 211 of the first communication device. Also, among three communication devices such as a printer 220, a mobile phone 230 carried around by a person, and another printer 240, and the like, displayed on the display unit 211 or the like, the printer 220 may be selected through a touch input, or the like, by using the second communication device 212.

In addition, by selecting the second communication device 212 (220), an image of the second communication device 212 (220) may be stored and used for the purpose of identifying the second communication devices later, and relative space coordinates with respect to the second communication device 212 may be obtained from the first communication device in consideration of the position and size within the display unit of the selected second communication device 212 (220).

Next, in the step 120 of transmitting a request for a communication link to the selected second communication device, a request for a communication link including information regarding the establishment of a link on the basis of the first communication device required for establishing a communication link may be transmitted to the selected second communication device.

Here, the information regarding the establishment of a link may include at least one of the absolute space coordinates of a reference device and relative space coordinates between the reference device and a communication link establishment target device.

For example, the absolute space coordinates of the reference device, namely, the absolute space coordinates of the first communication device, may refer to space coordinates within a three-dimensional space that can be acquired by using a GPS system, or the like. Namely, the absolute space coordinates of the reference device may be the position of the first communication device within a coordinate space, which is expressed as the three-dimensional coordinate value.

In addition, the relative space coordinates between the reference device and the communication link establishment target device may be relative space coordinates from the first communication device to the second communication device, which may refer to the position of the second communication device expressed as a spatial coordinate value when the first communication device is considered as a reference point or a starting point.

Meanwhile, estimated absolute space coordinates of the second communication device according to the request for a communication link may be calculated by using the absolute space coordinates of the first communication device and the relative space coordinates from the first communication device to the second communication device.

Namely, in FIG. 2, as for the second communication device 212 displayed on the display unit 211 of the first communication device, an actual position of the second communication device 210 within a three-dimensional space of the second communication device 220 may be calculated in consideration of the position within the screen, the size of the object displayed on the screen, and the orientation ($\theta, \phi$) from the center of the first communication device.

In addition, the information regarding the establishment of a link may include at least one of an image of the reference device, an image of the communication link establishment target device, and an image of the communication link establishment target device extracted from the screen.

For example, the image of the reference device, namely, the first communication device, may be delivered to the second communication device to inform the second communication device about a communication link establishment target, while the image of the communication link establishment target device, namely, the second communication device, and the image of the second communication device extracted from the screen of the first communication device may be delivered to the second communication device to inform the second communication device that the second communication device is the communication link establishment target.

In addition, the information regarding the establishment of a link may include a specific identifier which is at least one of a number, a barcode, a name and an address that may uniquely express the identity of the reference device.

For example, initially, the request for a communication link is delivered to the second communication device through the screen of the first communication device, but a communication link may be established according to a general communication scheme by using a specific identifier, namely, at least one of a number, a barcode, a name, and an address of the information regarding the establishment of a link included in the request for a communication link.

In addition, in transmitting the request for a communication link including the information regarding the establishment of a link on the basis of the first communication device required for establishing a communication link to the selected second communication device (step 120), a beam may be formed from the first communication device toward the second communication device to transmit the request for a communication link.

Namely, when the first communication device is configured to include a plurality of antennas in FIG. 2, data may be transmitted toward the accurately selected second communication device by using beam forming 260.

Next, in the step (step 130) of receiving the request for a communication link from the first communication device, a request for a communication link including information regarding the establishment of a link on the basis of the first communication device required for establishing a communication link may be received from the first communication device.

As described above, the information regarding the establishment of a link on the basis of the first communication device may include at least one of the absolute space coordinates of the first communication device and the relative space coordinates between the first communication device and the second communication device.

Also, as described above, the information regarding the establishment of a link on the basis of the first communication device may include at least one of the image of the first communication device, the image of the second communication device, and the image of the second communication device extracted from the screen of the first communication device.

In addition, as described above, the information regarding the establishment of a link on the basis of the first communication device may include a specific identifier which is at least one of a number, a barcode, a name, and an address that may uniquely express the identity of the first communication device.

As a result, the information regarding the establishment of a link on the basis of the second communication device may be generated by using the information regarding the establishment of a link on the basis of the first communication device, and whether to connect a communication link with the first communication device can be determined.

In addition, in the step (step 130) of receiving the request for a communication link including the information regarding the establishment of a link on the basis of the first communication device required for establishing a communication link from the first communication device, the direction in which the request for a communication link is received from the first communication device to the second communication device may be recognized.

Next, in the step (step 140) of transmitting the communication link response to the first communication device, a communication link response including information regarding the establishment of a link on the basis of the second communication device required for establishing a communication link may be transmitted to the first communication device.

As discussed above, the information regarding the establishment of a link on the basis of the second communication device required for establishing the communication link may include at least one of the absolute space coordinates of the second communication device and relative space coordinates between the second communication device and the first communication device, may include at least one of an image of the second communication device, an image of the first communication device, and an image of the first communication device extracted from the screen of the second communication device, and may include a specific identifier which is at least one of a number, a barcode, a name, and an address that may uniquely express the identity of the second communication device.

The information regarding the establishment of a link on the basis of the second communication device may be uniquely generated by the second communication device, and may be generated by using information regarding the establishment of a link on the basis of the first communication device included in the received request for a communication link.

For example, absolute space coordinates of the second communication device may be space coordinates in a three-dimensional space that can be acquired by using a GPS system, or the like. Namely, the absolute space coordinates of the second communication device may be the position of the second communication device within a coordinate space, which is expressed as the three-dimensional coordinate value. In addition, the absolute space coordinates of the second communication device may be calculated by using relative space coordinates between the first and second communication devices included in the information regarding the establishment of a link on the basis of the first communication device.

In addition, the relative space coordinates between the second and first communication devices may be calculated by using a direction in which the request for a communication link is received.

The image of the second communication device may be included in the communication link response and transmitted. In particular, the image of the second communication device may be used to discriminate the second communication device in the first communication device.

In addition, in the step (step 140) of transmitting the communication link response including the information regarding the establishment of a link on the basis of the second communication device required for establishing a communication link to the first communication device, a beam may be formed toward the first communication device to transmit the communication link response.

Namely, like the case of the first communication device, when the second communication device is configured to include a plurality of antennas, a communication link response may be transmitted toward the first communication device through beamforming.

Thereafter, in the step (step 150) of receiving the communication link response from the selected second communication device, the communication link response including information regarding the establishment of a link on the basis of the second communication device required for establishing a communication link may be received from the selected second communication device.

The step (step 150) of receiving of the communication link response including the information regarding the establishment of a link on the basis of the second communication device required for establishing a communication link from the selected second communication device (step 150) may play the like role as the step (step 130) of receiving the request for a communication link including the information regarding the establishment of a link on the basis of the first communication device required for establishing a communication link from the first communication device.

Here, as discussed above, the information regarding the establishment of a link on the basis of the second communication device required for establishing the communication link may include at least one of the absolute space coordinates of the second communication device and relative space coordinates between the second communication device and the first communication device, may include at least one of an image of the second communication device, an image of the first communication device, and an image of the first communication device extracted from the screen of the second communication device, and may include a specific identifier which is at least one of a number, a barcode, a name, and an address that may uniquely express the identity of the second communication device.

In addition, like the step (step 130) of receiving the request for a communication link including the information regarding the establishment of a link on the basis of the first communication device required for establishing a communication link from the first communication device, in the step (step 150) of receiving the communication link response including the information regarding the establishment of a link on the basis of the second communication device required for establishing a communication link from the selected second communication device, the direction in which the request for a communication link is received from the second communication device by the first communication device may be recognized.

In addition, in the step (step 150) of receiving the communication link response from the selected second communication device, at least one communication link response may be received, and the communication link from the second communication device may be extracted from among the at least one communication link response.

In particular, in extracting the communication link response from the second communication device from among the at least one communication link response, at least one of the information regarding the establishment of a link on the basis of the first communication device and the information regarding the establishment of a link on the basis of the second communication device included in the communication link response may be used.

For example, a method of establishing absolute space coordinates of the second communication device and comparing the estimated absolute space coordinates with absolute space coordinates of the second communication device included in the information regarding the establishment of a link on the basis of the second communication device may be employed, or a method of comparing the direction in which the communication link response is received and the relative space coordinates from the first communication device to the second communication device may be employed.

In addition, a method of comparing the image of the second communication device and the image of the second communication device included in the information regarding the establishment of a link on the basis of the second communication device may be employed.

Thereafter, the step (step 160) of establishing a communication link between the first and second communication devices by using the information regarding the establishment of a link on the basis of the first communication device and the information regarding the establishment of a link on the basis of the second communication device and the step (step 170) of establishing a communication link between the second and first communication devices by using the information regarding the establishment of a link on the basis of the second communication device and the information regarding the establishment of a link on the basis of the first communication device are performed by the first communication device and the second communication device, respectively, and a communication link between the first and second communication devices may be completed according to the respective performing results.

Once the communication link between the first and second communication devices is completed, the first and second communication devices may be able to exchange various types of data by using the completed communication link.

In particular, the communication link between the first and second communication devices may be completed by using the absolute space coordinates of the first communication device, the absolute space coordinates of the second communication device, and relative space coordinates between the first and second communication devices.

In addition, the communication link between the first and second communication device may be completed by using the image of the first communication device, the image of the second communication device, the image of the second communication device extracted from the screen of the first communication device, and the image of the first communication device extracted from the screen of the second communication device.

In particular, the communication link between the first and second communication device may be completed by using a specific identifier which is at least one of a number, a barcode, a name, and an address that uniquely expresses the first communication device and the second communication device, rather than using the space coordinates or the images.

Figure 3:
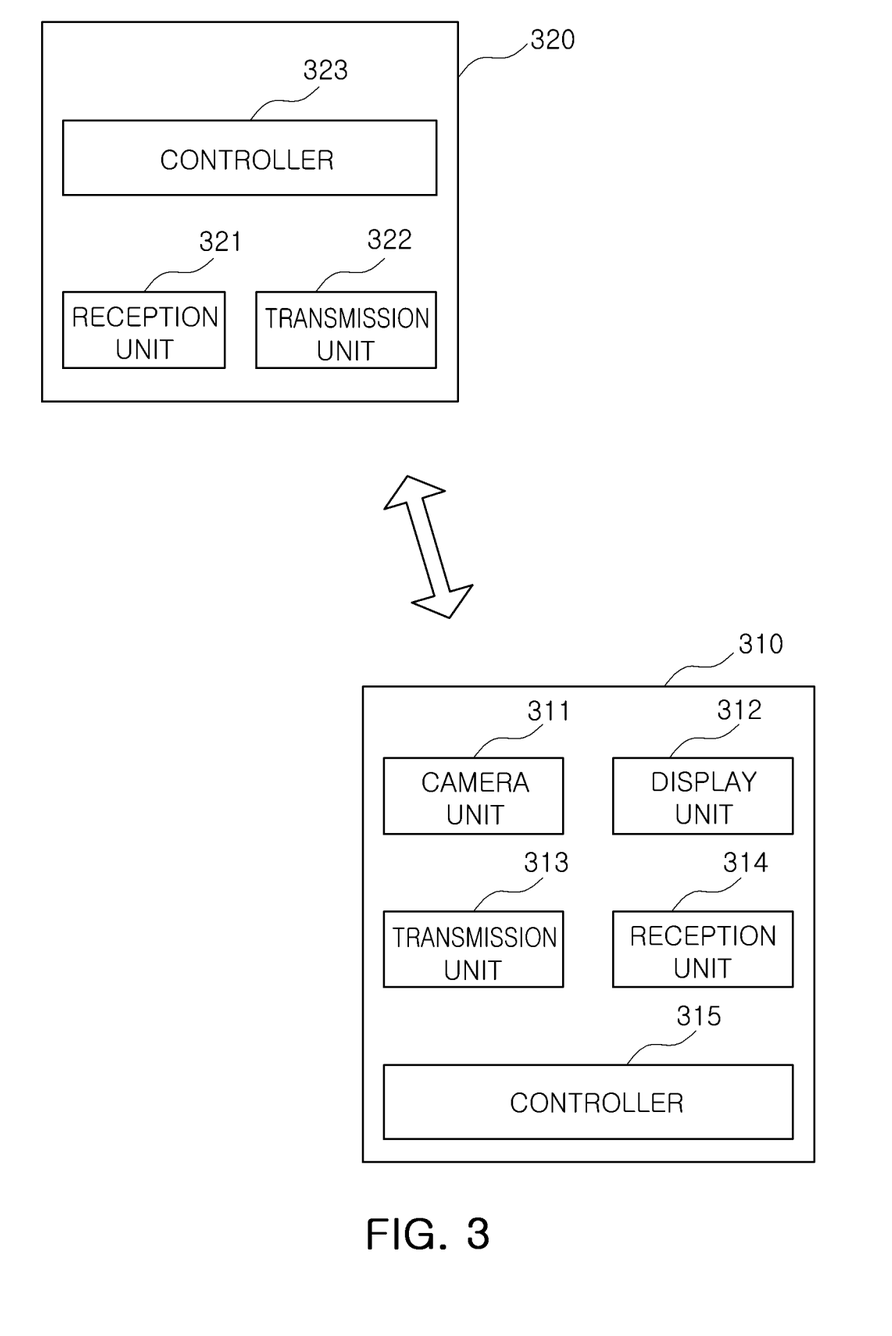
FIG. 3 is a schematic block diagram of a device for selecting a target from a screen and establishing a communication link according to an exemplary embodiment of the present invention.

FIG. 3 is a schematic block diagram of a device for selecting a target from a screen and establishing a communication link according to an exemplary embodiment of the present invention.

With reference to FIG. 3, a first communication device 310 for selecting an object from a screen to establish a communication link according to an exemplary embodiment of the present invention may include; a camera unit collecting an image of a second communication device, a display unit 312 displaying the collected image of the second communication device on a screen, a transmission unit 313 transmitting a request for a communication link including information regarding the establishment of a link on the basis of the first communication device required for establishing a communication link to the second communication device, a reception unit 314 receiving a communication link response including information regarding the establishment of a link on the basis of the second communication device required for establishing a communication link from the second communication device, and a controller 315 selecting the second communication device displayed on the screen of the display unit 312, generating the request for a communication link, analyzing the communication link response, and establishing a communication link between the first and second communication devices by using the information regarding the establishment of a link on the basis of the first communication device and the information regarding the establishment of a link on the basis of the second communication device.

First, the camera unit 311 for collecting an image of the second communication device may collect an image of at least one communication device with which a communication link is desired to be established.

The display unit 312 displays the image of the at least one communication device collected by the camera unit 311 on the screen, so that the second communication device with which a communication link is to be established can be selected.

The transmission unit 313 may transmit the request for a communication link including the information regarding the establishment of a link on the basis of the first communication device required for establishing a communication link to the second communication device.

In transmitting the request for a communication link by the transmission unit 313, a beam may be formed in the direction of the second communication device to transmit the communication link request.

The reception unit 314 may receive a communication link response including the information regarding the establishment of a link on the basis of the second communication device required for establishing a communication link from the second communication device.

In particular, in receiving the communication link response by the reception unit 314, a communication link response from the second communication device may be extracted from among at least one communication link response.

In extracting the communication link response from the second communication device from among the at least one communication link response, at least one of the information regarding the establishment of a link on the basis of the first communication device and the information regarding the establishment of a link on the basis of the second communication device included in the communication link response may be used. Also, the direction in which the communication link response is received may be used.

For example, a method of establishing absolute space coordinates of the second communication device and comparing the estimated absolute space coordinates with absolute space coordinates of the second communication device included in the information regarding the establishment of a link on the basis of the second communication device may be employed, or a method of comparing the direction in which the communication link response is received and the relative space coordinates from the first communication device to the second communication device may be employed.

In addition, a method of comparing the image of the second communication device and the image of the second communication device included in the information regarding the establishment of a link on the basis of the second communication device may be employed.

The controller 315 may select the second communication device displayed on the screen of the display unit 312, generate the request for a communication link, analyze the communication response, and establish a communication link between the first and second communication devices by using the information regarding the establishment of a link on the basis of the first communication device and the information regarding the establishment of a link on the basis of the second communication device.

Here, the information regarding the establishment of a link may include at least one of the absolute space coordinates of a reference device and relative space coordinates between the reference device and communication link establishment target device. The information regarding the establishment of a link may include at least one of an image of the reference device, an image of the communication link establishment target device, and an image of the communication link establishment target device extracted from the screen of the reference device. The information regarding the establishment of a link may include a specific identifier which is at least one of a number, a barcode, a name, and an address that may uniquely express the identity of the second communication device.

With reference to FIG. 3, a second communication device 320 310 for selecting an object from a screen to establish a communication link according to an exemplary embodiment of the present invention may include a reception unit 321 receiving a request for a communication link including information regarding the establishment of a link on the basis of the first communication device required for establishing a communication link from the first communication device, a transmission unit 322 transmitting a communication link response including information regarding the establishment of a link on the basis of the second communication device required for establishing a communication link to the first communication device, and a controller 323 analyzing the received request for a communication link, generating the communication link response, and establishing a communication link between the second and first communication devices by using the information regarding the establishment of a link on the basis of the second communication device and information regarding the establishment of a link on the basis of the first communication device.

First, the reception unit 321 may receive a request for a communication link including the information regarding the establishment of a link on the basis of the first communication device required for establishing a communication link from the first communication device.

In receiving the request for a communication link by the reception unit 321, the direction in which the request for a communication link is received from the first communication device to the second communication device may be recognized.

The transmission unit 322 may transmit a communication link response including the information regarding the establishment of a link on the basis of the second communication device required for establishing a communication link to the first communication device.

In transmitting the communication link response by the transmission unit 322, a beam may be formed toward (or in the direction of) the first communication device to transmit the communication link response.

The controller 323 may analyze the received request for a communication link, generate the communication link response, and establish a communication link between the second and first communication devices by using the information regarding the establishment of a link on the basis of the second communication device and information regarding the establishment of a link on the basis of the first communication device.

As set forth above, according to exemplary embodiments of the invention, a user can select a target upon viewing the target with his or her eyes and communicate with him or her, rather than performing communication based on an existing identifier (e.g., number, barcode, name, address, and the like) to communicate with the target, thereby providing a very fast and convenience means for the user to select a communication target.

In addition, the user can access an object by using a beam formation, a location-based space coordinate estimation, an image processing technique, and the like, without prior information regarding the object, thus creating various application fields.

In particular, when the user wants to print a file of a mobile terminal by a nearby printer, he or she may view and select the printer through a window of the mobile device to open a communication therebetween, sends the file of the mobile device to the printer, to thereby print the file.

In addition, the present invention can be applicable for communication between people as well as between a person and an object. Namely, an image of the user may be stored in a mobile terminal of individuals, so when a counterpart within visibility requests communication, the user may respond thereto and the both can communicate with each other.

In addition, the means may be applicable for communication between the objects, providing a convenient communication access means. Namely, the means may be provided to an object having a viewing means such as a robot, so that the object can communicate with another object within visibility.

Meanwhile, a communication link is established by the present invention, and thereafter, a different communication means such as Wi-Fi may be used for transmitting or receiving a large capacity of data.

Thus, a method allowing the user to select a familiar target device can be provided, and a ubiquitous network providing a ubiquitous service can be easily established.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for establishing a communication link of a first communication device, the method comprising:
   selecting an image of a second communication device from a screen of the first communication device;
   calculating an actual position of the second communication device based on a position of the image of the second communication device within the screen of the first communication device;
   transmitting a request for a communication link including information regarding the establishment of a link on the basis of the first communication device required for establishing a communication link to the selected second communication device, wherein the first communication device comprises a plurality of antennas, and wherein the transmitting the request comprises transmitting the request toward the second communication device through beamforming using the plurality of antennas and the calculated actual position of the second communication device;
   receiving a communication link response including information regarding the establishment of a communication link on the basis of the second communication device required for establishing a communication link from the second communication device; and
   establishing a communication link between the first communication device and the second communication device by using the information regarding the establishment of a link on the basis of the first communication device and the information regarding the establishment of a link on the basis of the second communication device, wherein the information regarding the establishment of a link on the basis of the first communication device comprises at least one of absolute space coordinates of the first communication device or relative space coordinates between the first communication device and the second communication device.

2. The method of claim 1, wherein the link establishment information comprises at least one of an image of the first communication device, an image of the second communication device, or an image of the second communication device extracted from the screen.

3. The method of claim 1, wherein the information regarding the establishment of a link comprises a specific identifier which is at least one of a number, a barcode, a name, or an address that uniquely expresses the identity of the first communication device.

4. The method of claim 1, wherein, in the receiving of the communication link response, at least one communication link response is received, and the communication link response from the second communication device is extracted from the at least one communication link response.

5. The method of claim 4, wherein, in the extracting of the communication link response from the second communication device from the at least one communication link response, at least one of the information regarding the establishment of a link on the basis of the first communication device or the information regarding the establishment of a link on the basis of the second communication device included in the communication link response is used.

6. The method of claim 1, wherein, in the receiving of the communication link response, a reception direction of the communication link response from the second communication device to the first communication device is recognized.

7. The method of claim 1, wherein the calculating the actual position of the second communication device comprises calculating the actual position of the second communication device based on the position of the image of the second communication device within the screen of the first communication device, a size of the image of the second communication device within the screen of the first communication device, and an orientation of the image of the second communication device from a center of the first communication device.

8. A method for establishing a communication link of a second communication device, the method comprising:

receiving a request for a communication link including information regarding the establishment of a link on the basis of a first communication device required for establishing a communication link from the first communication device;

transmitting a communication link response including information regarding the establishment of a link on the basis of the second communication device required for establishing a communication link to the first communication device, wherein the second communication device comprises a plurality of antennas, and wherein the transmitting the communication link response comprises transmitting the communication link response toward the first communication device through beamforming using the plurality of antennas; and establishing a communication link between the second communication device and the first communication device by using the information regarding the establishment of a link on the basis of the second communication device and the information regarding the establishment of a link on the basis of the first communication device, wherein the information regarding the establishment of a link on the basis of the second communication device comprises at least one of absolute space coordinates of the second communication device or relative space coordinates between the first communication device and the second communication device, wherein the first communication device comprises a first plurality of antennas, wherein the request is received by the second communication device as a result of the first communication device transmitting the request toward the second communication device through beamforming using the first plurality of antennas and an actual position of the second communication device, wherein the actual position of the second communication device is calculated by the first communication device based on a position of an image of the second communication device within a screen of the first communication device.

9. The method of claim 8, wherein the link establishment information comprises at least one of an image of the first communication device, an image of the second communication device, or an image of the second communication device extracted from the screen.

10. The method of claim 8, wherein the information regarding the establishment of a link comprises a specific identifier which is at least one of a number, a barcode, a name, or an address that may uniquely express the identity of the first communication device.

11. The method of claim 8, wherein, in the receiving of the request for a communication link, the direction in which the request for a communication link is received from the first communication device to the second communication device is recognized.

12. The method of claim 8, wherein the actual position of the second communication device is calculated by the first communication device based on the position of the image of the second communication device within the screen of the first communication device, a size of the image of the second communication device within the screen of the first communication device, and an orientation of the image of the second communication device from a center of the first communication device.

13. A first communication device comprising:

a camera unit configured to collect an image of a second communication device;

a display unit configured to display the collected image of the second communication device on a screen;

a transmission unit configured to transmit a request for a communication link including information regarding the establishment of a link on the basis of the first communication device required for establishing a communication link to the second communication device, wherein the transmission unit comprises a plurality of antennas, and wherein the transmission unit is configured to transmit the request toward the second communication device through beamforming using the plurality of antennas and an actual position of the second communication device;

a reception unit configured to receive a communication link response including information regarding the establishment of a link on the basis of the second communication device required for establishing a communication link from the second communication device; and a controller configured to select the collected image of the second communication device displayed on the screen of the display unit, calculate the actual position of the second communication device based on a position of the collected image of the second communication device within the screen, generate the request for a communication link, analyze the communication link response, and establish a communication link between the first communication device and the second communication device by using the information regarding the establishment of a link on the basis of the first communication device and the information regarding the establishment of a link on the basis of the second communication device, wherein the information regarding the establishment of a link on the basis of the first communication device comprises at least one of absolute space coordinates of the first communication device or relative space coordinates between the first communication device and the second communication device.

14. The first communication device of claim 13, wherein the link establishment information comprises at least one of an image of the first communication device, an image of the second communication device, or an image of the second communication device extracted from the screen.

15. The first communication device of claim 13, wherein the controller is configured to calculate the actual position of the second communication device based on the position of the collected image of the second communication device within the screen, a size of the collected image of the second communication device within the screen, and an orientation of the collected image of the second communication device from a center of the first communication device.

16. A second communication device comprising:
a reception unit configured to receive a request for a communication link including information regarding the establishment of a link on the basis of a first communication device required for establishing a communication link from the first communication device;
a transmission unit configured to transmit a communication link response including information regarding the establishment of a link on the basis of the second communication device required for establishing a communication link to the first communication device, wherein the transmission unit comprises a plurality of antennas, and wherein the transmission unit is configured to transmit the communication link response toward the first communication device through beamforming using the plurality of antennas; and
a controller configured to analyze the received request for a communication link, generate the communication link response, and establish a communication link between the second communication device and the first communication device by using the information regarding the establishment of a link on the basis of the second communication device and the information regarding the establishment of a link on the basis of the first communication device, wherein the information regarding the establishment of a link on the basis of the second communication device comprises at least one of absolute space coordinates of the second communication device or relative space coordinates between the first communication device and the second communication device, wherein the first communication device comprises a first plurality of antennas, wherein the request is received by the second communication device as a result of the first communication device transmitting the request toward the second communication device through beamforming using the first plurality of antennas and an actual position of the second communication device, wherein the actual position of the second communication device is calculated by the first communication device based on a position of an image of the second communication device within a screen of the first communication device.

17. The second communication device of claim 16, wherein the link establishment information comprises at least one of an image of the first communication device, an image of the second communication device, or an image of the second communication device extracted from the screen.

18. The second communication device of claim 16, wherein the actual position of the second communication device is calculated by the first communication device based on the position of the image of the second communication device within the screen of the first communication device, a size of the image of the second communication device within the screen of the first communication device, and an orientation of the image of the second communication device from a center of the first communication device.

* * * * *